Aug. 20, 1968  W. JUDA  3,398,069
ELECTROLYSIS OF AQUEOUS ELECTROLYTE SOLUTIONS
Original Filed Jan. 9, 1961  2 Sheets-Sheet 1

INVENTOR:
WALTER JUDA,
BY Aaron Tushin
ATTORNEY

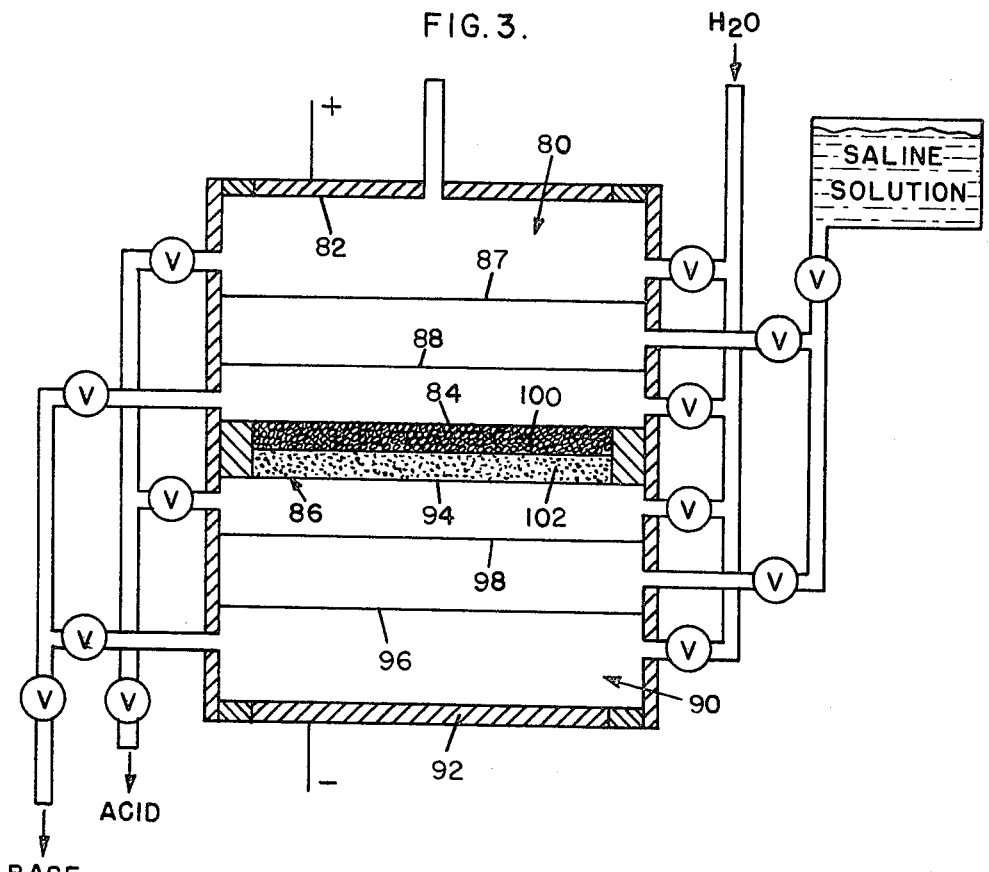
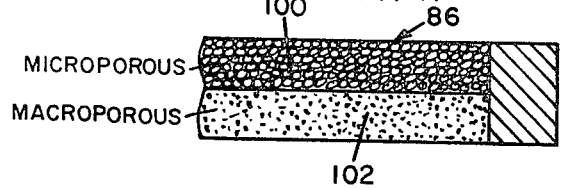

United States Patent Office 3,398,069
Patented Aug. 20, 1968

3,398,069
ELECTROLYSIS OF AQUEOUS ELECTROLYTE SOLUTIONS
Walter Juda, Lexington, Mass., assignor to Ionics Incorporated, Cambridge, Mass., a corporation of Massachusetts
Original application Jan. 9, 1961, Ser. No. 81,334, now Patent No. 3,214,362, dated Oct. 26, 1965. Divided and this application May 21, 1965, Ser. No. 470,286
2 Claims. (Cl. 204—98)

This application is a division of Ser. No. 81,334, filed Jan. 9, 1961, now Patent No. 3,214,362.

This invention relates to electrolysis of aqueous electrolyte solutions, and more particularly to the electrolytic conversion of a concentrated salt solution to an acid and a base, and novel apparatus for performing the conversion.

It is known that the passage of a direct electrical current of sufficient magnitude through an aqueous salt solution between a cathode and an anode immersed therein results in the electrolytic separation of the salt to form a base in the catholyte and an acid in the anolyte when the anode and cathode are maintained in separated compartments. Where the salt, for instance, is an alkali metal salt, alkali metal hydroxide and an acid are produced, but the anode is subject to chemical attack by oxygen produced therein as a reaction product. This not only necessitates frequent replacement of the anode, but results in low current efficiencies in the operation of the process.

Fuel cells, known in the art, can be characterized as electrochemical devices in which a substantial portion of the chemical energy of an oxidation-reduction reaction is converted directly to useful electrical energy. A typical fuel cell comprises a pair of porous, catalyzed electrodes separated by an electrolyte, means for introducing a fuel, such as hydrogen into one of the electrodes, and means for introducing an oxidant gas, such as air, into the other of the electrodes. The reaction of the fuel and oxidant creates electrical energy which is then available at the electrodes.

The use of electrolytic cells for effecting electrochemical conversions with electrical energy derived, at least in part, from the use of one or more porous, catalyzed electrodes to which are fed a fuel or oxidant in accordance with the requirements of the process and the nature of the particular catalytic electrode, has been disclosed in co-pending U.S. patent applications, Ser. No. 842,892, filed Sept. 28, 1959, now Patent No. 3,124,520; and Ser. No. 7,046, filed Feb. 5, 1960, now Patent No. 3,103,473. In these disclosures, the anode process, i.e., the ionization of a fuel supplied to the anode, was employed to produce, by direct conversion, part of the energy consumed in the over-all process. In co-pending U.S. patent applications, Ser. No. 8,269, filed Feb. 12, 1960, and now abandoned, and Ser. No. 66,498, filed Nov. 1, 1960, now Patent No. 3,117,066, part of the direct current used for the electrochemical conversion of certain compounds was produced by the cathode process, i.e., the ionization of an oxidant supplied to the cathode.

Consequently, a principal object of the present invention is to provide a novel process for the electrolysis of saline electrolyte solutions to form basic and acidic aqueous products which a considerable saving in the electrical energy required. Other objects of the present invention are to provide a novel apparatus for performing the process of the invention; to provide an apparatus for performing said process which is compact, produces the base and acid at a substantially reduced cost, is simple to operate, and in which the problems of corrosion by and disposal of gaseous by-products is substantially lessened, and to provide such an apparatus which comprises a novel bipolar electrode. Other objects of the invention will in part be obvious and will in part appear hereinafter.

The invention accordingly comprises the process involving several steps and the relation and order of one or more of such steps with respect to each of the others, and apparatus possessing, the construction, combination of elements and arrangement of parts which are exemplified in the following detailed disclosure, and the scope of the application of which will be indicated in the claims.

For a fuller understanding of the nature and object of the invention, reference should be had to the following detailed description taken in connection with the accompanying drawing in which:

FIGURE 3 is a schematic, side elevational, cross-section view of a plurality of cells forming another embodiment of an apparatus of the invention; and FIGURE 4 is an enlarged cross-sectional view of a bipolar electrode of the embodiment of FIGURE 3.

Figure 1:
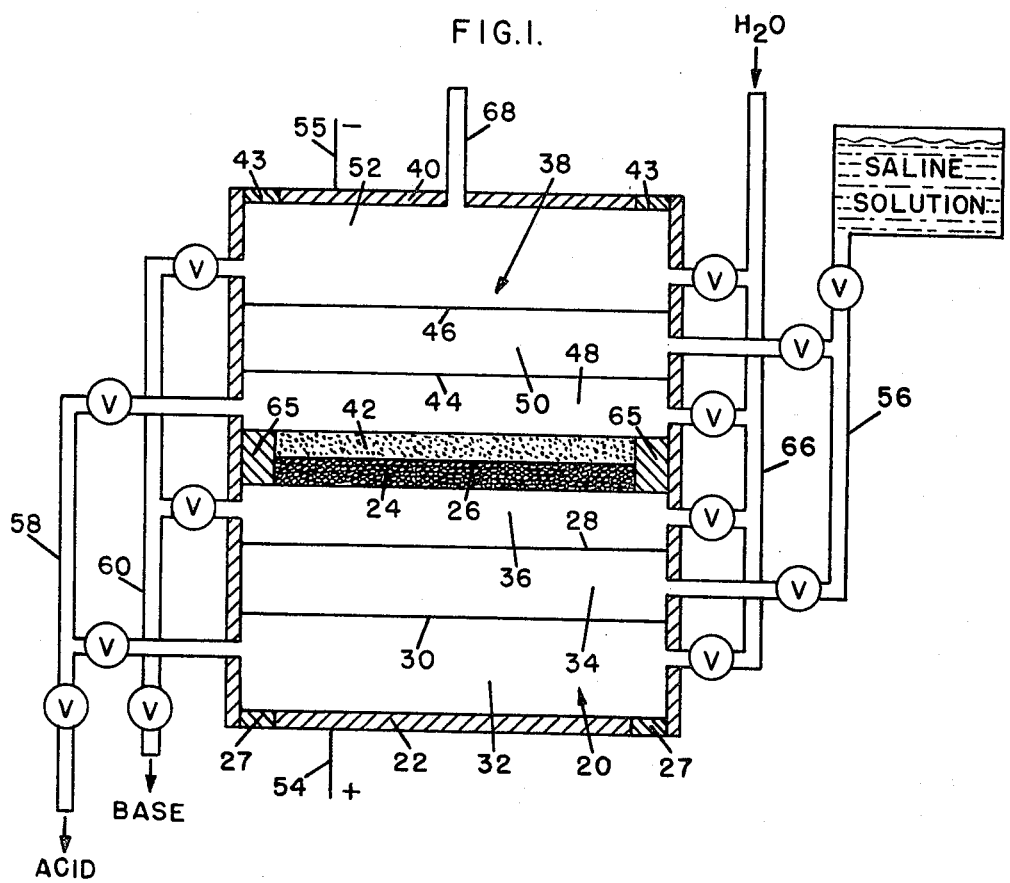
FIGURE 1 is a schematic, side elevational, cross-section diagram of a plurality of cells forming an embodiment of an apparatus of the invention.

For the purposes of illustration, application of the invention to the electrolytic conversion of aqueous sodium sulfate is detailed herein. The conversion of sodium sulfate to sulfuric acid and caustic soda has recognized commercial significance. In the well-known viscose process, for instance, the digestion of cellulose in caustic soda forms the sodium salt of the former which is then reacted with carbon disulfide to yield a viscous, colloidal, xanthate sol in dilute aqueous alkali. After the xanthate has been allowed to ripen, the cellulose is regenerated in filament form by precipitation in a solution comprising sulfuric acid, thereby forming sodium sulfate. Thus, caustic soda and sulfuric acid are employed in large quantities in the viscose industry and the conversion of the "waste" sodium sulfate back to the original acid and base at a reasonable cost is a highly desirable object. Many efforts have been directed toward converting the sodium sulfate for reuse in the viscose process and some examples of methods heretofore proposed may be found in the patent literature for example, U.S. Patent No. 2,273,795, and British Patent No. 764,181. In the electrochemical methods heretofore proposed, the costs of the electrolytic conversion of sodium sulfate has been largely determined by the amount of electrical energy employed in the cells. In most electrolytic cells for the electrolysis of concentrated solutions of alkali salts, such as sodium sulfate, the individual cells each comprise a plurality of compartments defined by one or more permeable partition or barrier disposed in the inter-electrode space. Such partitions have been in some instances simple porous diaphragms such as in the cell disclosed in U.S. Patent No. 1,126,627, or they have been formed as ion permselective membranes, such as in the cell disclosed in U.S. Patent No. 2,723,229. Such barriers or permeable partitions have been included primarily to minimize intermixing of the products formed at the electrodes while providing a comparatively free path for the passage of electrical current from one electrode to the other.

One embodiment of the invention generally comprises a multicellular apparatus such as a plurality of electrolytic cells in linear adjacent array, the interior of each cell being separated from the interior of the next adjacent cell by a unitary, bipolar electrode. Each bipolar electrode is formed as a unitary element comprising an anodic surface and a cathodic surface. One end cell of the array includes a cathode while the other end cell includes an anode. Thus, each cell comprises a pair of electrodes, and the array is arranged with the anode and anodic surfaces and the cathode and cathodic surfaces alternate in sequence so that when the cells are filled with an aqueous electrolyte, the passage of current between the anode and cathode evolves hydrogen gas at the cathode and at the cathodic surfaces of the bipolar electrodes. The anode surfaces are formed as electrically conductive, microporous, catalyzed elements, and the cathodic surfaces comprise electrically conductive, porous means for introducing hydrogen gas formed thereat into an associated anodic surface. The gas diffuses from the cathodic surface into the anodic surface where it is dissociated into ions by the catalytic action of the latter. Catalysts which are effective for the purpose involved herein are well known, per se, and may for example be found in the patent to Grubb, No. 2,913,511, column 3, lines 40 et seq. The ions are displaced from the surface of the catalyst so as to be driven through the triphase boundary formed by electrolyte, leaving a current producing electron at the anode for each ion formed. Each cell preferably includes one or more ion-permeable barriers disposed between the cell electrodes.

Referring now to the drawings, there is shown in FIGURE 1 an embodiment of an apparatus for performing the process of the invention and comprising a plurality of three-compartment cells. In the form shown, the apparatus is shown as a two-cell structure comprising a first substantially hollow cell 20 including a positive electrode or anode 22 and a negative electrode which, in the form shown, is cathodic surface 24 of bipolar electrode 26 described in more detail hereinafter, the anode and cathode surface being in spaced-apart relation to one another. Anode 22 is preferably electrically insulated by known means, such as insulator 27, from the body of the cell. The interspace between anode 22 and cathodic surface 24 is divided by a pair of permeable barriers 28 and 30 into anode chamber 32, intermediate chamber 34 and cathode chamber 36. Barriers 28 and 30, in one form of the invention, comprise macroporous, fluid-permeable diaphragms, formed for instance of porous ceramic plates, fiber asbestos cloth or matting, or other materials well known in the art and substantially inert with respect to the fluids intended to permeate therethrough.

In an alternative embodiment, the barriers comprise ion-permselective membranes generally formed of a solid, sheet-like, polymeric structure preferably reinforced by an embedded screen, mat, or the like, and containing ion exchange resins fixed in the polymeric matrix. One of the cell membranes, for instance barrier 28, is a film or layer containing a cation-exchange resin, well known in the art and examples of which are described in U.S. Patent Nos. 2,731,408, 2,731,411, etc. A preferred form of cation permselective membranes is one which contains carboxylate groups such as a membrane manufactured by copolymerizing divinyl benzene and an olefinic carboxylic compound such as an anhydride, ester, or acid chloride of acrylic acid and its derivatives in solution in a suitable solvent. By saturating the polymerized solid material with water, the anhydride, ester, or acid groupings in the polymeric matrix is inverted to salt or acid forms of carboxylate groups. The presence of an aqueous solvent phase in the polymerized solid provides a structure which is both electrically conductive and selectively permeable to cations. The other ion permselective membrane, for instance barrier 30, is then an anion permselective membrane, well known in the art and examples of which are described in U.S. Patent Nos. 2,730,768, 2,800,445, etc.

The structure of te apparatus also comprises a second substantially hollow cell 38 including a negative electrode or cathode 40 and a positive electrode, which, in the form shown, is anodic surface 42 of bipolar electrode 26. Cathode 40 is preferably electrically insulated from the body of the cell by means, such as insulator 43, known in the art. Cathode 40 and anodic surface 42 are in spaced-apart relation to one another, the interspace between them also being divided by a pair of permeable barriers 44 and 46 into an anode chamber 48, intermediate chamber 50 and cathode chamber 52. Barriers 44 and 46 are substantially of the same type as barriers 28 and 30, depending of course upon the particular embodiment of the invention desired. It will be seen that the barriers within each cell are so disposed that the communication between the chambers formed by the barriers may be had only through the latter.

Anode 22 and cathode 40 are respectively connected to means, such as electrically conductive leads 54 and 55, for impressing a DC potential across the apparatus.

Means are provided for introducing an aqueous solution of a salt into the intermediate chambers of each cell, and in the form shown, this comprises a conduit or manifold 56 ported to the intermediate chamber of each cell so as to provide a common feed thereto. Means are also provided for removing aqueous effluent from each anode chamber of each cell, and in the form shown, the latter means comprises a conduit or manifold 58 joining all of the anode chambers in common. Similarly, means such as manifold 60 are provided for removing aqueous effluent from each of the cathode chambers of each cell, manifold 60 being connected to the cathode chambers to form a common conduit therefrom.

Figure 2:
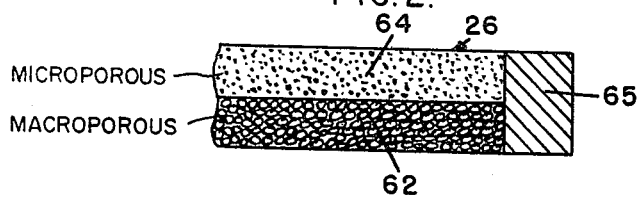
FIGURE 2 is an enlarged diagrammatic cross-sectional view of a bi-polar electrode element of the embodiment of FIGURE 1.

The individual cells forming the invention may be varied as to size of the cell, as to both the size and number of the individual chambers or compartments in each cell, the form of the means for supplying aqueous salt solution to the center or intermediate chambers, the means for removing the aqueous effluent from the anode and cathode chambers, valving, and the material from which the cell bodies or enclosures are formed. However, adjacent cells must be separated from one another substantially only by a bipolar electrode common to the two cells. In the preferred form, all of the bipolar electrodes (a portion of such an electrode being shown in enlarged cross-section in FIGURE 2) comprise a cathode portion 62 and an anode portion 64 of equal size. Where the electrode is intended to catalyze a fuel gas, such as hydrogen, the porosity, and therefore the specific surface area of the bipolar electrode, is graded from the cathode portion to the anode portion, the two portions being pneumatically connected to one another. In the preferred embodiment of a hydrogen catalyzing electrode, cathode portion 62 is preferably substantially macroporous, while the anode portion 64 preferably is a substantially microporous, catalyzed element having a very high surface area. This may be accomplished, for example, by forming the anode portion of a sintered mat of catalytic, metal micro-filaments, such as nickel powder activated by platinum, or a sponge of platinum, iridium, palladium, rhodium, and other metals chosen from Group VIII of the Periodic Table. Cathode portion 62 may be formed of nickel or steel sponge, porous carbon, or the like. The cathode portion and anode portion are in intimate physical and electronic contact with one another throughout so as to form an integral unit by any convenient bonding method known in the art which does not interfere with either the pneumatic intercommunication between the portions or with the ready passage of electrical current from one portion to the other. Means, such as plastic seal 65, formed of a substantially chemically inert, water and gas impervious material, for instance polytetrafluorethylene, polyvinyl chloride, and the like, is provided as a continuous strip around the common joined edges of the cathode portion and anode portion to insure that no gas leak can occur at the edges of the bipolar electrode.

In the form of the apparatus shown, there is included means, such as manifold 66 for providing a controlled supply of water to the anode and cathode chambers in order to control the concentration of the products formed in the latter and to assist in governing the flow of fluid through the apparatus.

In keeping with the discussion of the electrolytic conversion of aqueous sodium sulfate set forth hereinbefore, the operation of the invention will be described with relation to that process. In operation, a solution of sodium sulfate is fed through manifold 56 to intermediate chambers 34 and 50 of each cell. Where barriers 28, 30, 44, and 46 are porous diaphragms, it is desirable to maintain a steady flow of electrolyte into the cells through manifold 56 in order to prevent back-migration of the ions. Simultaneously, a stream of water is fed into each anode chamber and cathode chamber through manifold 66. When a D.C. electric potential is initially applied to the apparatus at anode 22 and cathode 40, the resistance is first comparatively high until the ion concentration in the cathode and anode chambers becomes sufficient to readily conduct the electric current therethrough. This occurs in a comparatively short time interval. The sodium ions and sulfate ions, under the influence of the applied electrical potential, move from the center chambers to the respective adjoining cathode and anode chambers, caustic soda being formed in the cathode chambers and sodium acid sulfate being formed in the anode chambers. Along with the production of the acid and base, hydrogen gas is formed at the respective cathodes while oxygen is produced at the anodes.

It should be noted that the apparatus of FIGURE 1 is preferably constructed so that the cells are stacked in a vertical array with the cathode compartment of each cell at the top and the anode compartment of each cell at the bottom. Thus, the hydrogen produced at the cathode of the lower-most cell of the array tends to rise and, diffusing readily through the porous structure of the cathode, permeates the anodic portion of the bipolar electrode separating the lower cell from the next upper-most cell. The hydrogen gas thus diffused into the anodic portion of the bipolar electrode is dissociated into ions by the catalyst contained in the anodic portion of the bipolar electrode. The ions thus formed are displaced from the surface of the catlayst and are injected into the anode chamber wherein they combine with oxygen produced at the anode to form water, thus preventing anode attack by the oxygen. For each such ion displaced from the anodic portion, a current producing electron is released, thereby providing a portion of the electrical power required for the process. The construction of the bipolar electrode therefore provides an apparatus where hydrogen produced at the cathodic portion of each bipolar electrode is employed to contribute to the over-all electrical power required in the process and substantially reduces the effective internal resistance of the apparatus. Of course, because the cathode of the upper-most cell is not necessarily porous nor does it necessarily form a portion of a bipolar electrode, the hydrogen produced thereat does not diffuse into an adjacent cell. Instead, means, such as outlet port 68 are provided for venting the hydrogen gas which may then be lead to a microporous, catalyzed form of anode 22 through appropriate duct work or conduit means, or may be disposed of in some other manner. From the respective cathode compartments, a high purity grade of sodium hydroxide solution is continuously withdrawn through manifold 60 while from the respective anode compartments a mixture of sodium sulfate and sulfuric acid, i.e., sodium acid sulfate, is withdrawn through manifold 58.

In another embodiment of an apparatus for performing the process of the invention, shown particularly in FIGURE 3, the apparatus again comprises a two-cell structure comprising a first cell 80 including an anode 82 and a negative electrode comprising cathodic surface 84 of bipolar electrode 86 described hereinafter. The anode and cathode surface are in spaced-apart relation to one another and, analogously to the embodiment of FIGURE 1, the interspace between the electrodes is divided by a pair of permeable barriers 87 and 88 of the type hereinbefore described into three chambers, one adjacent the anode, another adjacent the cathode, and a third chamber intermediate the first two. The structure also comprises a second cell 90 including a cathode 92 and a positive electrode comprising anodic surface 94 of the bipolar electrode, the latter forming an element which separates the cells on from the other. The interspace between the electrodes of cell 90 are also divided by a pair of permeable barriers 96 and 98 into three chambers. It should be noted that the apparatus, as is the apparatus of FIGURE 1, is preferably constructed so that the cells are stacked in a vertical array, but in this embodiment the anode chamber of each cell is at the top-most portion thereof while the cathode chamber of each cell is at the bottom.

Bipolar electrode 86, which separates the two cells, and a portion of which is shown in enlarged cross-section in FIGURE 4, comprises a cathode portion 100 and an anode portion 102 of substantially equal size. Because the bipolar electrode in this embodiment is intended to catalyze an oxidant gas, such as oxygen, the porosity and therefore the specific surface area of the electrode is graded from the anode portion to the cathode portion, the two portions, being pneumatically connected and in intimate physical and electronic contact with one another. In the preferred embodiment of an oxygen catalyzing bipolar electrode, anode portion 102 is preferably a substantially macroporous body, while cathode portion 100 preferably is a substantially microporous, catalyzed element having a very high surface area. Cathode portion 100 is formed, for example, of microporous carbon catalyzed with silver, gold or other noble metals, or as a microporous silver element. Anode portion 102 in turn is formed, for instance, of steel sponge or macroporous carbon or the like. In all other respects, bipolar electrode 86 is formed similarly to the bipolar electrode heretofore discussed in connection with FIGURE 2.

In operation, the electrolysis of a saline solution introduced into the said compartments through appropriate conduit means is quite similar to the operation of the apparatus of FIGURE 1 heretofore described. The ions of the dissociated salt, under the influence of applied electrical potential, move from the intermediate chambers through the adjoining ion-permeable barriers to the respective adjoining cathode chamber and anode chamber, a base being formed in the former and an acid being formed in the latter. Simultaneously, oxygen gas is produced at the respective anodes while hydrogen gas is formed at the respective cathodes. Because of the vertical construction of the cell, the oxygen produced at the anode of the lower-most cell tends to rise and diffuse readily through the porous structure of the anodic portion permeating into the cathodic portion of the bipolar electrodes separating the lower cell from the next adjacent cell. The oxygen gas thus fed into the cathodic portion of the bipolar electrode is dissociated into ions by the catalyst contained in the latter and the ions are injected into the cathode chamber wherein they combine with the hydrogen produced at the cathode to form water. For each such ion displaced from the cathodic portion, a current producing electron is released, thereby providing a portion of the electrical power in a manner similar to that heretofore described.

The apparatus herein disclosed for performing the process of the invention is useful for many processes. For instance, the apparatus of FIGURE 1 is useful for performing a dual process at the cost of electrical power ordinarily required for but one of the processes. Referring to FIGURE 1, a similar apparatus thereto is used wherein permeable barriers 28, 30, 44 and 46 are removed. Into cell 38 there is introduced a solution of $CuSO_4$, this cell being provided with a cathode 40 upon which Cu is intended to plate out and therefore can be formed of many electrically conductive materials such as Cu, Fe, Ni and the like. Cell 20 is provided with an anode, such as graphite. Into cell 20 there is introduced a solution of NaCl. Upon impressing a DC potential across the two cells, Cu will plate out in cell 38 and the cell effluent will contain $H_2SO_4$ contaminated with $CuSO_4$ in varying degrees according to the cell voltage, the concentration and flow rate of the inflowing $CuSO_4$ solution and the size of the cathode relative to the instantaneous concentration of $CuSO_4$. Simultaneously, the NaCl solution is electrolyzed to produce NaOCl as the effluent of cell 20. By inserting a porous diaphragm between the anode and cathodic surface in cell 20 and flowing the NaCl into the interspace between the anode and the diaphragm, the cell will produce NaOH with the evolution of $Cl_2$ at the anode. As with the embodiment heretofore described in connection with FIGURE 1, the hydrogen evolved at cathodic surface 24 produces electrical power so that the voltage drop across the bipolar electrode is negligible. Hence, it will be apparent that several useful products, $H_2SO_4$ and either caustic soda, chlorine or NaOCl are produced with the electrowinning of copper with large savings of electrical energy.

By replacing the $CuSO_4$ solution with $FeSO_4$ it will be immediately apparent that the same structure can be employed to produce both NaOCl (or NaOH and Cl) and plate out iron instead of copper. In this latter process, it is preferred to introduce a porous diaphragm or cation exchange membrane to separate the cathode of cell 38 from anodic surface 42 of the bipolar electrode and flow the $FeSO_4$ solution into the interspace between the diaphragm and cathode. This maintains the solution pH adjacent the cathode at a relatively high level and minimizes attack by the resulting acid upon the plated-out metal.

Since certain changes may be made in the above process and apparatus without departing from the scope of the invention herein involved, it is intended that all matter contained in the above description as shown in the accompanying drawings shall be interpreted as illustrative and not in a limiting sense.

What is claimed is:

1. A process for the electrolysis of an aqueous saline electrolyte comprising the steps of introducing said aqueous electrolyte into a multicellular device wherein the cells are separated by electrically conductive, porous elements each of which constitutes one electrode of each of adjacent separated cells, impressing an electrical current upon said device between a pair of terminal electrodes thereof thereby forming a basic solution and hydrogen gas adjacent negative electrodes and an acidic solution and oxygen gas adjacent positive electrodes, diffusing one of said gases through the electrodes adjacent thereto and into the electrode of opposite polarity of the next adjacent cell, catalyzing said one of said gases in said electrode of opposite polarity to form ions of said one of said gases thereby contributing a portion of the electrical power required for the electrolysis, combining said ions with the other of said gases adjacent said electrode of opposite polarity thereby disposing of the other of said gases, withdrawing said basic solution from adjacent said negative electrodes, and withdrawing said acidic solution from adjacent said positive electrodes.

2. A process for the electrolysis of aqueous saline electrolytes as defined in claim 1 including the steps of segregating said acidic and basic solutions from one another and from said electrolyte by permeable barriers.

References Cited

UNITED STATES PATENTS

| | | | |
|---|---|---|---|
| 2,767,135 | 10/1956 | Juda et al. | 204—93 |
| 2,681,884 | 6/1954 | Butler | 204—98 |
| 2,829,095 | 4/1958 | Oda et al. | 204—98 |
| 2,955,999 | 10/1960 | Tirrell | 204—180 |
| 2,969,315 | 1/1961 | Bacon | 204—284 |
| 3,080,304 | 3/1963 | Andous | 204—129 |
| 3,282,834 | 11/1966 | Justi et al. | 204—180 |

FOREIGN PATENTS

| | | |
|---|---|---|
| 973,810 | 10/1964 | Great Britain. |

JOHN H. MACK, *Primary Examiner.*

D. R. JORDAN, *Assistant Examiner.*